United States Patent
Hasegawa

(10) Patent No.: US 8,907,888 B2
(45) Date of Patent: Dec. 9, 2014

(54) PORTABLE ELECTRONIC DEVICE

(75) Inventor: Junichi Hasegawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 829 days.

(21) Appl. No.: 12/675,114

(22) PCT Filed: Aug. 25, 2008

(86) PCT No.: PCT/JP2008/065132
§ 371 (c)(1),
(2), (4) Date: Apr. 26, 2010

(87) PCT Pub. No.: WO2009/028472
PCT Pub. Date: Mar. 5, 2009

(65) Prior Publication Data
US 2011/0057872 A1    Mar. 10, 2011

(30) Foreign Application Priority Data
Aug. 24, 2007    (JP) ................. 2007-218847

(51) Int. Cl.
*G09G 5/00*      (2006.01)
*G06F 3/0485*    (2013.01)
*H04M 1/725*     (2006.01)

(52) U.S. Cl.
CPC ......... *H04M 1/72583* (2013.01); *G06F 3/0485* (2013.01)
USPC .......................................... 345/156; 715/810

(58) Field of Classification Search
CPC ............ G06F 3/01; G06F 3/016; G06F 3/02; G06F 3/0481
USPC ................... 345/156–184; 715/700, 810–845
See application file for complete search history.

(56) References Cited

U.S. PATENT DOCUMENTS

| | | | | |
|---|---|---|---|---|
| 6,337,694 B1 * | 1/2002 | Becker et al. | ................. | 345/684 |
| 6,486,896 B1 * | 11/2002 | Ubillos | ................. | 715/784 |
| 7,551,188 B2 * | 6/2009 | Ahokas | ................. | 345/684 |
| 7,587,683 B2 * | 9/2009 | Ito et al. | ................. | 715/823 |
| 7,956,847 B2 * | 6/2011 | Christie | ................. | 345/173 |
| 7,975,237 B2 * | 7/2011 | Hama et al. | ................. | 715/786 |
| 8,203,505 B2 * | 6/2012 | Kuiken et al. | ................. | 345/31 |
| 8,386,958 B1 * | 2/2013 | Zavitaev et al. | ................. | 715/810 |

(Continued)

FOREIGN PATENT DOCUMENTS

| | | |
|---|---|---|
| JP | 2002-140144 | 5/2002 |
| JP | 2002-328758 | 11/2002 |
| JP | 2003-150291 | 5/2003 |
| JP | 2005017651 A * | 1/2005 |

OTHER PUBLICATIONS

Translation of JP, 2005-085771, Okada, Publication Jan. 2005.*

*Primary Examiner* — Dmitriy Bolotin
(74) *Attorney, Agent, or Firm* — Duane Morris LLP

(57) ABSTRACT

A portable electronic device has a display part (16) which can display a plurality of selection items; an operation part (12) for selecting the selection item displayed on the display part (16); and a control part (18) which switches the selection item to other selection item selected from the selection items displayed on the display part (16) by operation of the operating part (12). The control part (18) has a function of changing the switching speed of the selection item selected by the operation of the operation part (12) in accordance with display mode of each of the selection items displayed on the display part (16). Thus, usability is improved by, for instance, changing a scroll speed for the continuous selection operation.

10 Claims, 7 Drawing Sheets

(56) References Cited

U.S. PATENT DOCUMENTS

| | | | |
|---|---|---|---|
| 2004/0085328 A1* | 5/2004 | Maruyama et al. | 345/619 |
| 2005/0001815 A1* | 1/2005 | Tsunoda | 345/158 |
| 2006/0075358 A1* | 4/2006 | Ahokas | 715/784 |
| 2006/0242595 A1* | 10/2006 | Kizumi | 715/786 |
| 2006/0246940 A1* | 11/2006 | Foxenland | 455/550.1 |
| 2007/0180409 A1* | 8/2007 | Sohn et al. | 715/863 |
| 2007/0209016 A1* | 9/2007 | Takayama et al. | 715/780 |
| 2007/0236475 A1* | 10/2007 | Wherry | 345/173 |
| 2007/0300180 A1* | 12/2007 | Hama et al. | 715/787 |
| 2008/0020810 A1* | 1/2008 | Park | 455/575.1 |
| 2009/0303258 A1* | 12/2009 | Uehori et al. | 345/681 |
| 2009/0309892 A1* | 12/2009 | Uehori et al. | 345/581 |

* cited by examiner

FIG. 3

SELECTION SWITCHING SPEED JUDGMENT TABLE

| CHARACTER SIZE | SWITCHING SPEED |
|---|---|
| SMALLEST | 75ms |
| SMALL | 125ms |
| MEDIUM | 250ms |
| LARGE | 350ms |
| LARGEST | 600ms |

←—170

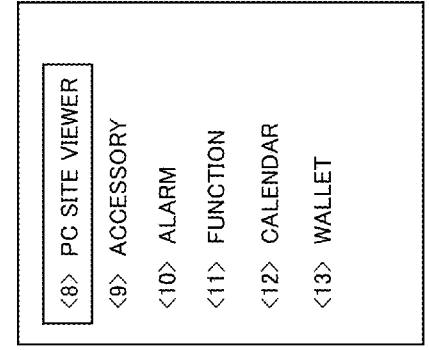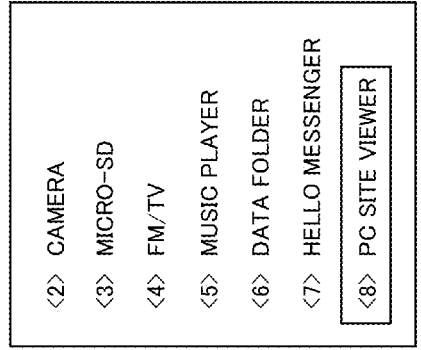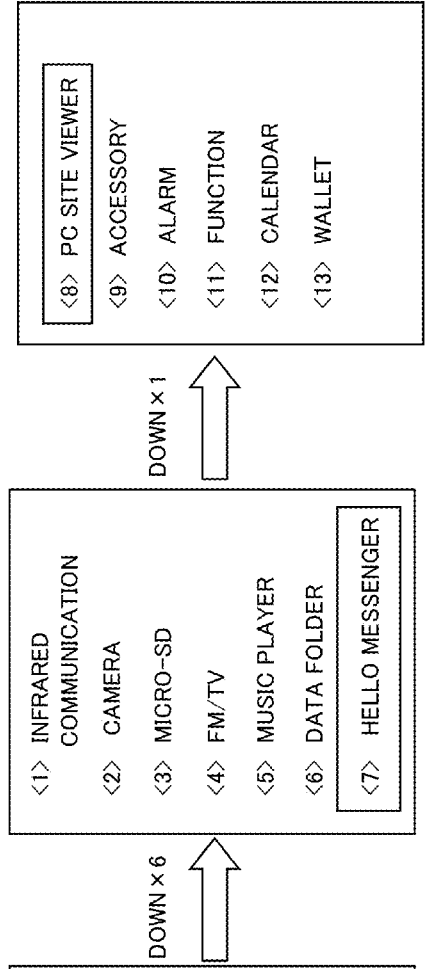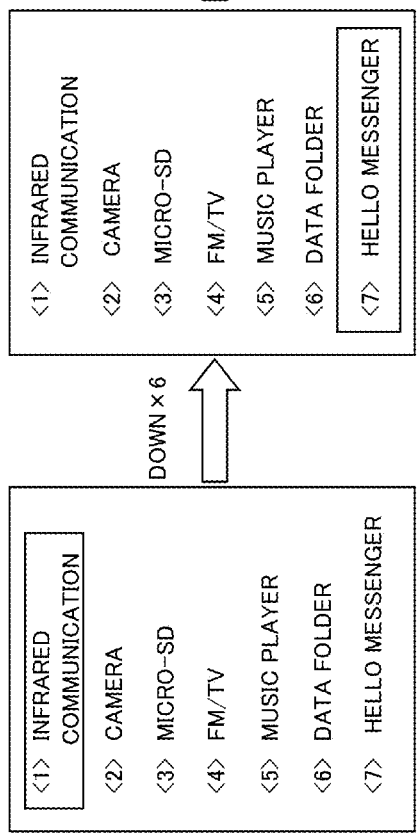

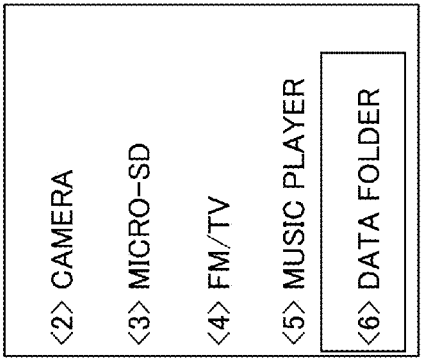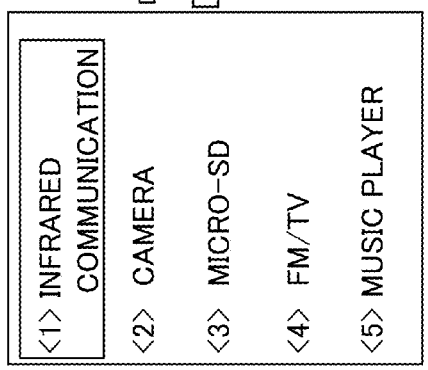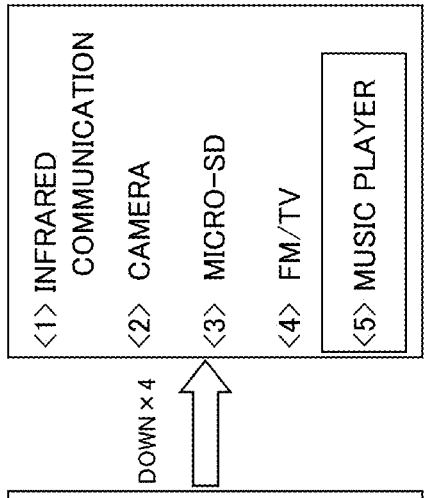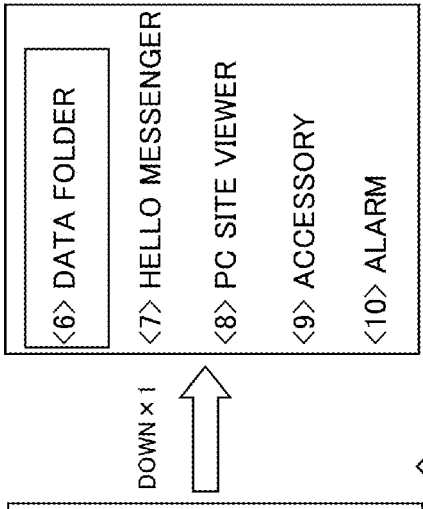

PORTABLE ELECTRONIC DEVICE

CROSS-REFERENCE TO RELATED APPLICATIONS

This is a U.S. National Phase Application of International Application No. PCT/JP2008/065132 filed Aug. 25, 2008, which claims priority to Japanese Patent Application No. 2007-218847 filed Aug. 24, 2007, the disclosures of which are incorporated herein by reference in their entirety.

TECHNICAL FIELD

The present invention relates to a mobile phone or other portable electronic device.

BACKGROUND ART

The currently fast spreading mobile phones are configured so that a liquid crystal display device (LCD) or other display device displays selection items corresponding to various types of functions, a user uses a cursor key to perform a selection operation and select a desired item, and the result of execution of that is displayed (see for example Patent Document 1)

Patent Document 1: Japanese Patent Publication (A) No. 2002-140144

DISCLOSURE OF THE INVENTION

Problem to be Solved by the Invention

In this regard, for senior citizens and other users who have difficulty recognizing small characters, mobile phones offer the function of changing the size of the display characters to a larger size so as to improve the viewability.

In this case, however, in comparison with a case of display by the normal display character size, the amount of information which can be displayed on the display screen, that is, the number of displayed characters, is reduced.

For this reason, sometimes the number of selection items displayed on the display screen is decreased.

The mobile phone described above is configured so that the selection items are switched at a certain speed when the user depresses a cursor key for a long period etc. for a continuous selection operation.

For this reason, the mobile phone described above has the disadvantage that the screen with the decreased number of displayed characters and less amount of information displays the same items for a shorter time in comparison with a screen with a large number of displayed characters and a large amount of information, so the usability becomes poorer.

The present invention provides a portable electronic device capable of improving the usability by changing the switching speed for the selection items at the time of a selection operation.

Means for Solving the Problem

A portable electronic device of the present invention has a display part capable of displaying a plurality of selection items, an operation part for selecting a selection item displayed on the display part, and a control part switching the selection item selected along with operation of the operation part from the plurality of selection items which being displayed on the display part, wherein the control part changes a switching speed of the selection item selected along with operation of the operation part in accordance with a display form of the plurality of selection items displayed on the display part.

Preferably, the control part changes the switching speed of the selection item selected along with operation of the operation part in accordance with a number of the plurality of selection items displayed on the display part.

Preferably, the control part can selectively execute a first display processing of displaying the plurality of selection items on the display part by a predetermined display form and a second display processing in which the number of selection items displayed on the display part is smaller than the number of selection items in the first display processing and sets the switching speed in the second display processing slower than the switching speed in the first display processing.

Preferably, when the second display processing is executed, the control part displays, on the display part, specific selection items among the plurality of selection items displayed at the time of execution of the first display processing.

Preferably, the control part displays the selection items displayed on the display part when the second display processing is executed enlarged from the selection items displayed on the display part when the first display processing is executed.

Preferably, the control part changes the switching speed of the selection item selected along with operation of the operation part in accordance with a display size of the selection items being displayed on the display part.

Preferably, the control part sets the switching speed of the selected selection item slower than the switching speed of the other selection items when the display size of the selected selection item is larger than the display size of the other selection items.

Preferably, the control part changes the switching speed of the selection item selected along with the operation of the operation part in accordance with a amount of display information of the plurality of selection items being displayed on the display part.

Preferably, the control part sets the switching speed of the selected selection item slower than the switching speed of the other selection items when the amount of display information of the selected selection item is larger than the amount of display information of the other selection items.

Preferably, when the information displayed by a selection item is scrolled, the control part sets the switching speed of the selection item for which the display information is scrolled slower than the switching speed for a selection item which is not scrolled.

Preferably, the control part changes the switching speed for the selection item when an operation for selecting the selection item is continuously carried out.

Preferably, when the screen is switched from a first screen on which a portion of the plurality of selection items is displayed in accordance with the continuous operation for selecting a selection item to a second screen on which the remaining portion of the plurality of selection items is displayed, the control part changes the switching speed for the selection items displayed on the first screen in accordance with the switching time from the first screen to the second screen.

Preferably, the plurality of selection items displayed on the display part include menu items of a function menu.

Preferably, the plurality of selection items displayed on the display part include candidates for change of an input character at the time of character input processing.

Preferably, the control part displays the selection item selected along with operation of the operation part by a display form different from the other selection items being displayed on the display part.

Effect of the Invention

According to the present invention, by changing the switching speed of the selection items at the time of a selection operation, the usability can be improved.

BRIEF DESCRIPTION OF THE DRAWINGS

FIG. 3 is a diagram showing an example of the data structure of a scroll speed judgment table assigned to and stored in a memory part shown in FIG. 1.

FIG. 5A to FIG. 5D are diagrams showing one example of display forms of menu items at the time of a normal display mode of a portable electronic device according to an embodiment of the present invention.

FIG. 6A to FIG. 6D are diagrams showing one example of display forms of menu items at the time of an enlarged display mode of a portable electronic device according to an embodiment of the present invention.

DESCRIPTION OF NOTATIONS

11 . . . communication part, 12 . . . operation part, 14 . . . speaker (SP), 15 . . . microphone (MIC), 16 . . . display part, 17 . . . memory part, 18 . . . control part, 170 . . . selection switching speed judgment table, 180 . . . main control part, 181 . . . communication control part, 182 . . . data input control part, 184 . . . audio input/output control part, and 186 . . . display control part.

BEST MODE FOR CARRYING OUT THE INVENTION

Below, an embodiment of the present invention will be explained with reference to the attached drawings.

Figure 1:
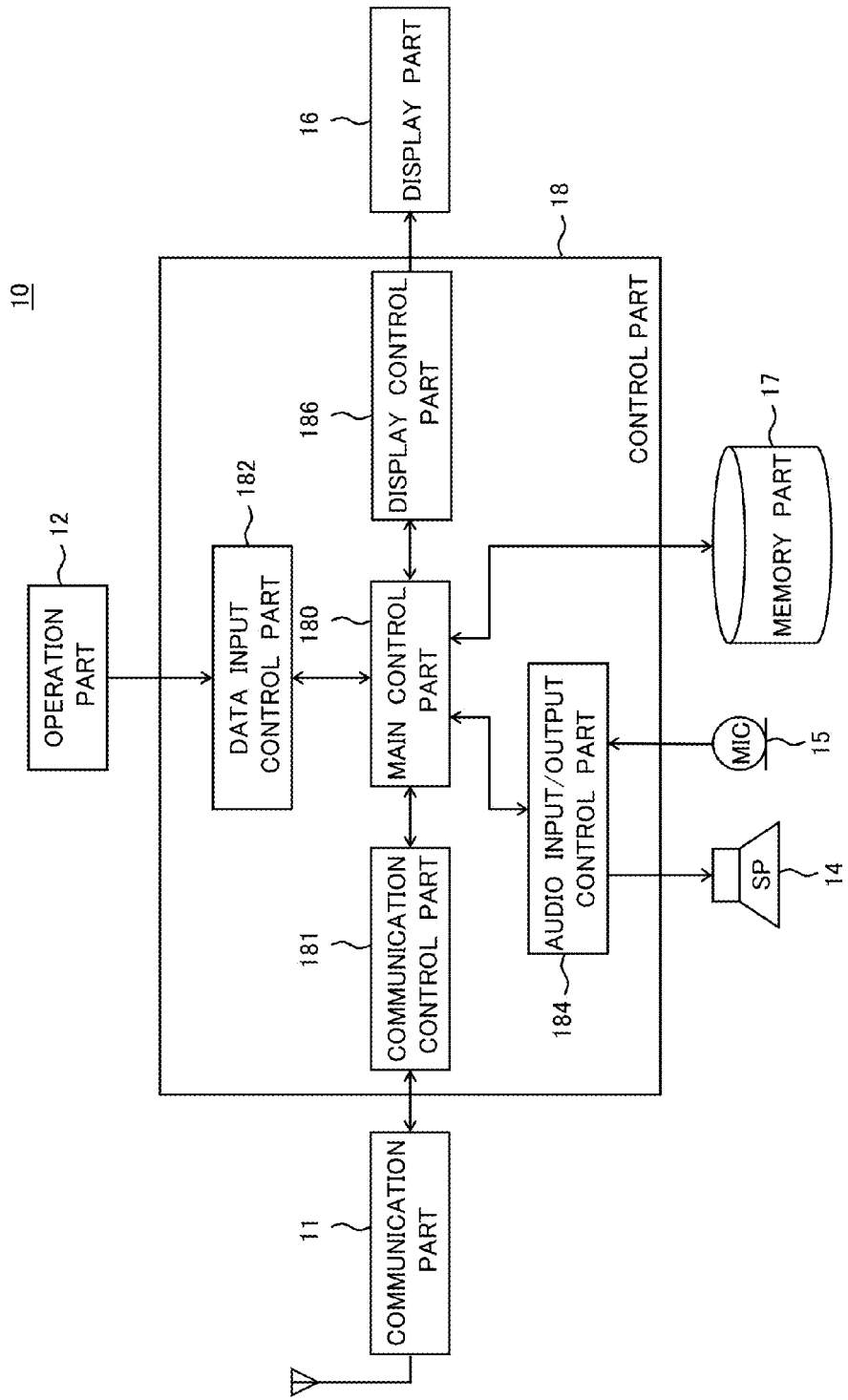
FIG. 1 is a block diagram showing an example of the configuration of a signal processing system of a portable electronic device according to an embodiment of the present invention.

FIG. 1 is a block diagram showing an example of the configuration of a signal processing system of a portable electronic device according to an embodiment of the present invention.

Here, a mobile phone 10 is illustrated as a portable electronic device.

The mobile phone 10 is, as shown in FIG. 1, configured by a communication part 11, operation part 12, speaker (SP) 14, microphone (MIC) 15, display part 16, memory part 17, and control part 18.

Figure 2:
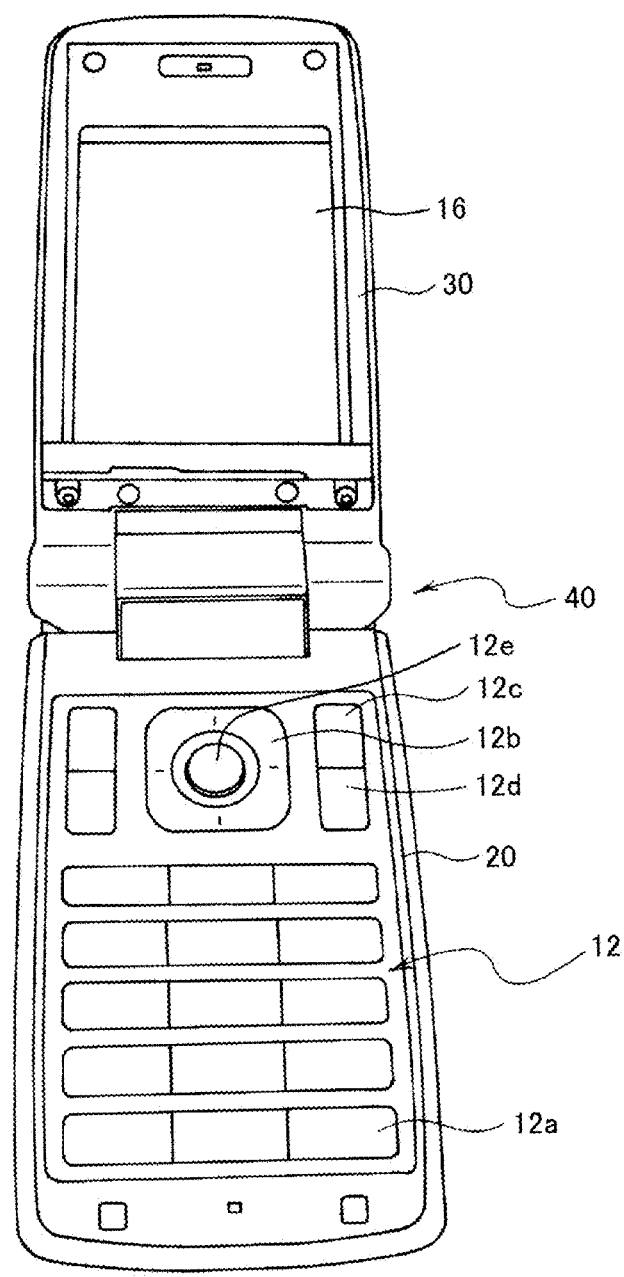
FIG. 2 is a perspective view showing an example of the appearance and configuration of a mobile phone constituting a portable electronic device according to an embodiment of the present invention.

Further, FIG. 2 is a perspective view showing an example of the appearance and configuration of a mobile phone constituting a portable electronic device according to an embodiment of the present invention. FIG. 2 mainly shows the array of keys.

As shown in FIG. 2, the mobile phone 10 is configured as a so-called flip-open type mobile phone and has a sender case 20 and a receiver case 30 which are connected to each other pivotably between an open state and a closed state.

The sender case 20 and the receiver case 30 form a housing of the mobile phone as a whole by connection of end portions by a connection part 40 forming a center axis of relative opening and closing operations.

In the sender case 20, an operation part 12 in which various types of keys exposed at the front surface are arranged is formed. Further, in the receiver case 30, a display part 16 is formed.

In the operation part 12 of the sender case 20, as the various types of keys, for example, a tenkey part 12a, a cursor key 12b, function keys 12c and 12d, an execute key 12e, etc. are arranged.

The keys of the tenkey part 12a described above are assigned pluralities of characters relating to Sino-Japanese ideographs, alphanumerics, phonetic kana marks, and symbols.

The cursor key 12b has a function as a so-called "direction key" or "arrow key" moving the cursor in up/down/left/right directions on the display screen of the display part 16.

The effective characters intended by the tenkey part 12a are switched by a toggle operation by an "input mode change key (identification key)" assigned to any of the function keys 12c.

Any of these keys, for example, a function key 12c, is assigned as the operation key for sending a send instruction etc.

Note that, this operation key may be assigned to a not shown side key as well which is arranged on a side surface of the sender case.

A detailed explanation will be given below of the concrete configuration and functions of the mobile phone 10 constituting a portable electronic device of the present embodiment.

The communication part 11 acquires a plurality of communication systems through the control part 18.

The communication part 11 performs wireless communication with a network system including a base station connected to a not shown mobile communication network according to, for example, a CDMA (Code Division Multiple Access) 2000 1x (hereinafter, simply referred to as 1x) or EVDO (Evolution Data Only) communication protocol.

Note that, EVDO communication is faster than 1x communication. 1x communication has the characteristic feature that it supports audio communication as well as data communication unlike EVDO communication.

The operation part 12 has, for example, a power key, speak key, tenkey (number keys), character keys, direction keys, an execute key, a send key, and other keys to which various functions are assigned.

When these keys of the operation part 12 are operated by the user, the control part 18 generates signals corresponding to those operation contents by a key scan and inputs these as an instruction of the user.

Note that, the "direction keys" are formed by a cursor (arrow) key 12b in the left/right/up/down directions.

By operating this cursor key 12b, the user can select any item from among a plurality of selection items displayed on the later explained display part 16 such as menu items of the function menu and conversion candidates for the input characters at the time of the character input processing It becomes possible for the user to change any item which is selected by operating the cursor key 12b in the left/right/up/down directions.

Further, it is possible to execute the function or menu item concerning the selected desired item by the depression of the "execute key" 12e.

Note that, an item selected from among a plurality of items displayed on the display part 16 is highlighted by being cursor inverted display etc. so that it can be differentiated from the other items and thereby is displayed by a display form different from that for the other items.

The speaker 14 and microphone 15 perform audio output and audio input by the audio input/output control part 184 of the control part 18.

Namely, the audio input/output control part 184 performs processing of an audio signal output from the speaker 14 and an audio signal input at the microphone 15. Specifically, it amplifies audio input from the microphone 15, performs analog-to-digital conversion, and further applies encoding or other signal processing to this to convert it to digital audio data and outputs the result to the control part 18.

Further, the audio input/output control part 184 applies decoding, digital-to-analog conversion, amplification, or other signal processing to the audio data supplied from the control part 18 to convert it to an analog audio signal and outputs the result to the speaker 14.

The display part 16 is configured by using, for example, a liquid crystal display panel, an organic EL (Electro-Luminescence) panel, or other display device and displays an image in accordance with a video signal supplied from the control part 18.

The display part 16 displays, for example, a phone number of a destination at the time of a send operation, a phone number of the other party at the time of reception, contents of received mail and transmitted mail, the date, time, remaining battery power, success of a send operation, a standby screen, and so on.

Further, the display part 16 displays menu items, conversion candidates for the input characters, and other selection items, news and other superimposed text, and other various types of information and images.

In the present embodiment, the plurality of selection items displayed on the display part 16 include menu items of the function menu.

Further, the plurality of selection items displayed on the display part 16 include change candidates for the input characters at the time of character input processing.

These data are, under the control by the later explained control part 18, drawn in a VRAM (Video RAM) region assigned to and stored in a predetermined region of the memory part 17, are read by the later explained display control part 186 in synchronization with a display timing of the display device configuring the display part 16, and are displayed on the display part 16.

The memory part 17 stores various types of data utilized for the processing in the control part 18. The memory part 17 stores, for example, an application program executed by the control part 18 and an address book for managing personal information such as phone numbers and e-mail addresses of other parties.

Further, the memory part 17 holds an audio file for playing back an incoming call sound and an alarm sound, an image file for the standby screen, various types of setting data, temporary data utilized in the processing process of the program, and so on.

Further, a VRAM region in which the display data is drawn by the later explained control part 18 is assigned to and stored in a predetermined region of the memory part 17.

Further, a selection switching speed judgment table 170 shown in FIG. 3 as an example of the data structure is assigned to and stored in the memory part 17. Details of the data structure etc. of the selection switching speed judgment table 170 will be explained later.

Note that, the above memory part 17 is configured by, for example, a nonvolatile memory device (flash memory), a random accessible memory device (SRAM, DRAM), or the like.

The control part 18 centrally controls the entire operation of the mobile phone.

Namely, the control part 18 controls operations of the function blocks explained above, that is, transmission/reception of signals at the communication part 11, input/output of audio, display of images on the display part 16 etc. so that various types of processing of the mobile phone 10 are executed in a suitable sequence in accordance with the operation of the operation part 12.

Various types of processing of the mobile phone 10 controlled by the control part 18 include control of audio speech carried out through a line exchange network, preparation and transmission/reception of e-mails, viewing of the Internet Web (World Wide Web) sites, and so on.

The control part 18 is provided with a computer (microprocessor) executing processing based on a program stored in the memory part 17 such as an operating system or application program. The control part 18 executes the processing explained above according to the sequence instructed in this program. Namely, the control part 18 sequentially reads command codes from the operating system, application program, or other program stored in the memory part 17 to execute the processing.

The control part 18, as shown in FIG. 1, is configured by a main control part 180, communication control part 181, data input control part 182, audio input/output control part 184, and display control part 186.

The communication control part 181 interfaces with the communication part 11, the data input control part 182 interfaces with the operation part 12, the audio input/output control part 184 interfaces with the speaker 14 and microphone 15, and the display control part 186 interfaces with the display part 16. All operate based on contents programmed by the main control part 180.

The control part 18 having such a configuration performs display of selection items, switching of display of the selection items, control of the switching speed, etc. shown below through the data input control part 182 and display control part 186 under the control of the main control part 180.

The main control part 180 of the control part 18 basically performs control for inputting data of a selection item selected by the operation of the operation part 12 from among a plurality of selection items displayed on the display part 16 through the data input control part 182 and switching the selection items selected.

The main control part 180 has a function of changing the switching speed of a selection item selected along with operation of the operation part 12 in accordance with the display form of the plurality of selection items displayed on the display part 16.

The main control part 180 changes the switching speed of a selection item selected along with operation of the operation part 12 in accordance with the number of the plurality of selection items being displayed on the display part 16.

The main control part 180 can selectively execute first display processing of displaying a plurality of selection items by a predetermined display form on the display part 16 and second display processing in which the number of selection items displayed on the display part 16 is smaller than the number of selection items in the first display processing. Further, the main control part 180 has a function of setting the switching speed of the selection items in the second display processing slower than the switching speed of the selection items in the first display processing.

The main control part 180, when the second display processing is executed, displays specific selection items on the display part 16 among the plurality of selection items displayed at the time of execution of the first display processing.

Further, the main control part 180 has a function of displaying the selection items displayed on the display part 16 when the second display processing is executed enlarged from the selection items displayed on the display part 16 when the first display processing is executed.

Further, the main control part 180 has a function of changing the switching speed of a selection item selected along with operation of the operation part 12 in accordance with the display size of the selection items being displayed on the display part 16.

The main control part 180, when the display size of the selected selection items is larger than the display size of the other selection items on the display part 16, sets the switching speed for the selected selection item slower than the switching speed for the other selection items.

Further, the main control part 180 changes the switching speed of a selection item selected along with operation of the operation part 12 in accordance with the amount of display information of the plurality of selection items being displayed on the display part 16.

At this time, when the amount of the display information of the selected selection item is larger than the amount of the display information of the other selection items, the main control part 180 sets the switching speed for the selected selection item slower than the switching speed for the other selection items.

Further, the main control part 180 has a function of setting the switching speed for a selection item with display information which is scrolled slower than the switching speed for a selection item with information which is not scrolled when the information displayed by the selection item is to be scrolled.

The main control part 180 has a function of changing the switching speed of selection items when the operation of the operation part 12 for selecting the selection items is continuously carried out.

In this case, the main control part 180 performs the following processing in a case where the screen is switched from a first screen on which a portion of the plurality of selection items is displayed to a second screen on which the remaining portion of the plurality of selection items is displayed in accordance with a continuous operation for selecting the selection items.

Namely, the main control part 180 changes the switching speed for the selection items displayed on the first screen in accordance with the switching time from the first screen to the second screen.

The main control part 180 issues an instruction to the display control part 186 to display a selection item selected along with the operation of the operation part 12 by a display form different from that of the other selection items being displayed on the display part 16.

Note that, the selection switching speed judgment table 170 assigned to and stored in the memory part 17 stores the switching speed defined for each of the character sizes (smallest, small, medium, large, largest) as shown in FIG. 3 as an example of its data structure.

Here, as explained above, the speed is set so that the switching speed of a selected item at the time of a continuous selection operation becomes slower as the character size becomes larger.

Further, the menu items, conversion candidates, and other selection items displayed on the display part 16 are highlighted by having any selected item displayed by cursor inverted display or the like.

For this reason, the switching speed of a selection item explained above means the speed of shift of the cursor inverted display (highlighting) from the item selected to an item selected by the continuous selection operation.

For example, the set switching speed is 75 ms when the character size is the smallest, while the set switching speed is 600 ms when the set character size is the largest.

When the item selected is switched along with a continuous selection operation, the set switching speed becomes a time (msec) for which one item is selected, that is, a time from when the item selected is switched up to any item to when it is switched to the next item.

Further, this switching speed is the switching time of the highlighting such as cursor inverted display for the selected item as well.

Figure 4:
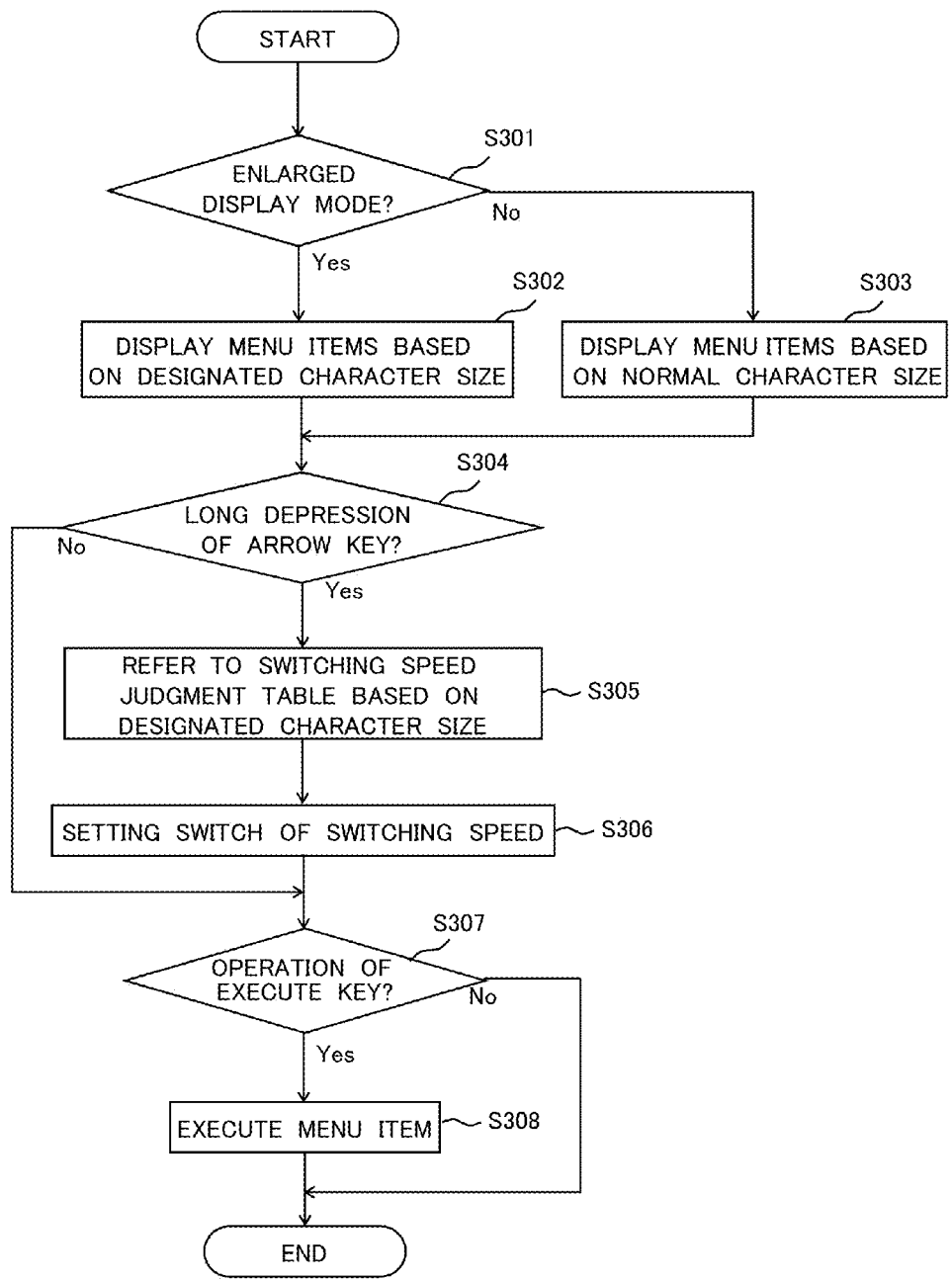
FIG. 4 is a flow chart showing an operation of a portable electronic device according to an embodiment of the present invention.

FIG. 4 is a flow chart showing an example of the operation of a mobile phone constituting a portable electronic device according to an embodiment of the present invention. Here, an example of display of the menu items is shown.

Below, the operation of the mobile phone 10 constituting a portable electronic device according to an embodiment of the present invention shown in FIG. 1 will be explained in detail with reference to the flow chart shown in FIG. 4.

Note that, in the following explanation, the first display processing will be explained as processing in a first display mode or normal display mode, and the second display processing will be explained as processing in a second display mode or enlarged display mode.

The main control part 180 in the control part 18 of the mobile phone 10 first judges whether or not the display size of the displayed characters is designated as enlarged display in the enlarged display mode (S301).

Any designation of an enlarged display mode can be judged by referring to a flag (not shown) stored in a predetermined region of the memory part 17.

Here, assume that the flag is ON in a case where the enlarged display mode is set in advance by the user at the time of setting of the system.

Note that, here, "any enlarged display mode" means any designation of the character size.

Assume that the user can designate the five levels of character sizes "smallest", "small", "medium", "large", and "largest" shown as an example in FIG. 3 for a display item displayed on the display part 16 in advance. At the time of the normal display (default), the size is fixed as, for example, "medium". Accordingly, here, only the cases of "large" and "largest" are judged as enlarged display modes.

In a case of judgment as an enlarged display mode (S301 "Yes"), the main control part 180 instructs the display of the menu items based on the designated character size to the display control part 186.

Due to this, the display control part 186 reads out the display content drawn in the VRAM region assigned to the memory part 17, specifically, the menu item display based on the designated character size, and displays it on the display part 16 (S302).

Note that, when the mode is not an enlarged display mode (S301 "No"), the display control part 186 displays the menu items based on the normal character size (S301).

Next, the main control part 180 judges any long depression when detecting depression of the "cursor (arrow) key" of the operation part 12 (S304).

Any long depression can be judged by the data input control part 182 performing key scan processing and, when it is judged that the arrow key is depressed, monitoring the time up to the release from depression.

When it is judged that the time up to the release from the depression of the "cursor (arrow) key" is a predetermined time or more and it is a long depression (S304 "Yes")), the main control part 180 recognizes a continuous selection operation (the arrow key is continuously depressed). Further, the main control part 180 refers to the selection switching speed judgment table 170 assigned to and stored in the predetermined region of the memory part 17 (S305).

That is, the main control part 180 retrieves the switching speed based on the designated character size and updates the content of the VRAM in accordance with this switching speed. Namely, the main control part 180 switches the setting of the switching speed (S306) and sends an instruction to the display control part 186 to read out the VRAM and display the content on the display part 16.

Upon receipt of this, the display control part 186 sequentially switches the menu item selected in accordance with the continuous selection operation at the operation part 12 based on the set switching speed. The display control part 186 highlights the selected item by cursor inversion, blinking etc.

That is, the display control part 186 switches the selection item highlighted by cursor inverted display or the like in response to the continuous selection operation at the operation part 12 in accordance with the switching speed based on the designated character size.

Further, when detecting the depression of the execute key by the operation part 12 (S307 "Yes"), the main control part 180 executes the menu item corresponding to the selected item (S308).

Note that, when it is judged at step S304 that the depression time from the depression to the release of the "arrow key" of the operation part 12 is less than a predetermined time and it is not a long depression operation (continuous selection operation), the main control part 180 performs the next control.

Namely, the main control part 180 performs control, irrelevant to the designated character size or normal character size or switching speed based on the operation mode, so that the menu item selected is sequentially switched whenever the "arrow key" of the operation part 12 is depressed and so that the menu item (function) corresponding to the selected item is executed in accordance with the operation of the execute key.

FIG. 5A to FIG. 5D show an example of the display form of menu items at the time of a normal display mode, and FIG. 6A to FIG. 6D show an example of the display form of menu items at the time of an enlarged display mode.

Here, in each case, a list type of display form is shown. For example, as shown in FIG. 5A to FIG. 5D, at the time of setting the normal character size, display of seven rows of information on the screen of the display part 16 is enabled, and the switching speed at that time is set at 250 ms.

First, when display of the menu items is instructed, as shown in FIG. 5A, seven menu items (<1> to <7>) are displayed on the display part 16 from the first menu item among all of the menu items. At this time, the first menu item <1> is selected, that is, is highlighted by cursor inverted display.

By depressing the arrow key (downward direction key) of the operation part 12 from this state shown in FIG. 5A, it becomes possible to sequentially select the menu item displayed.

Further, when this depression is a long depression, it is judged as a continuous selection operation and the selected menu item is sequentially switched in accordance with a predetermined switching speed (250 ms).

Further, when selecting a seventh menu item "<7> Hello Messenger" displayed at the lowermost row on the screen of the display part 16 by a continuous selection operation, it is sufficient to depress the downward direction key long until the state changes from the state shown in FIG. 5A to the state where the seventh menu item "<7> Hello Messenger" is selected (highlighted by cursor inverted display) (see FIG. 5B).

Further, when continuing to depress the arrow key, an eighth menu item "<8> PC site viewer" will be selected. Further, as shown in FIG. 5C, the eighth to 13th menu items are displayed on the display part 16 and the eighth menu item "<8> PC site viewer" displayed at the uppermost row of the screen is highlighted by cursor inverted display.

In this way, when selecting the eighth menu item "<8> PC site viewer" by the long depression operation (continuous selection operation), the time required up to the transition to the screen (second screen) shown in FIG. 5C from the screen (first screen) shown in FIG. 5A becomes 250 ms×7=1750 ms. For this reason, the first to seventh menu items displayed on the screen shown in FIG. 5A will be displayed for only a predetermined period (1750 ms).

Note that, when selecting the eighth menu item "<8> PC site viewer" by the long depression (continuous selection operation) in place of the embodiment explained above, as shown in FIG. 5D, the eighth menu item "<8> PC site viewer" may be displayed accompanied by highlighting by cursor inverted display at the lowermost row of the screen of the display part 16 as well.

In this case, the screen of the display part 16 will display the second to eighth menu items. The first menu item "<1> Infrared communication" will be displayed only for a predetermined period (1750 ms) in the same way as the embodiment explained above.

On the other hand, at the time of setting the enlarged character size (state where "large" is set in FIG. 3), in comparison with the time of setting the normal character size (state where "medium" is set in FIG. 3), the display size of the displayed characters is enlarged.

For this reason, the number of characters which can be displayed on the screen of the display part 16 is decreased. When displaying menu items, display of five rows of information, smaller than the seven rows at the time of setting the normal character size, becomes possible.

Further, at the time of setting the enlarged character size, the display character size is enlarged, therefore the display size of the selection items displayed on the screen of the display part 16 is enlarged as well and the number of characters which can be displayed is decreased, so the number of selection items displayed on the screen is further decreased.

Accordingly, when the display of menu items is instructed, as shown in FIG. 6A, five menu items (<1> to <5>) from the first menu item among all menu items are displayed on the display part 16. Further, the first menu item "<1> Infrared communication" is selected (highlighted by cursor inverted display).

By depressing the arrow key (downward direction key) of the operation part 12 from this state shown in FIG. 6A, it becomes possible to sequentially select the displayed menu items.

Further, when this depression is a long depression, it is judged as a continuous selection operation, the switching speed of the selection items is set from the selection switching speed judgment table 170 shown in FIG. 3 in accordance with the set character size, and the menu item selected is sequentially switched in accordance with this set predetermined switching speed. Note that, the switching speed of the selection items was changed in accordance with the display character size in this configuration, but the display size of the selection items is enlarged in accordance with the character size and the number of selection items on the screen of the display part 16 is decreased, therefore a configuration in which the switching speed of the selection items is changed in accordance with the display size of these selection items or the number of items displayed in place of the display character size may be employed as well.

Here, when selecting the fifth menu item "<5> Music player" displayed at the lowermost row of the screen of the display part 16 by a continuous selection operation, the downward direction key may be depressed long until the fifth menu item "<5> Music player" is selected (highlighted by cursor inverted display) (see FIG. 6B) from the state shown in FIG. 6A.

Further, when continuing the long depression operation of the arrow key, a sixth menu item "<6> Data folder" will be selected. Further, as shown in FIG. 6C, the sixth to 10th menu items are displayed on the display part 16 and the sixth menu item "<6> Data folder" is highlighted by cursor inverted display.

Note that, when selecting the sixth menu item "<6> Data folder" by the long depression operation (continuous selection operation), as shown in FIG. 6D, the sixth menu item "<6> Data folder" may be displayed at the lowermost row of the screen of the display part 16 accompanied by highlighting by cursor inverted display as well. In this case, the screen of the display part 16 will display only the second to sixth menu items.

At the time of setting this enlarged character size, when setting the switching speed when sequentially selecting menu items by a long depression operation (continuous selection operation) the same as the predetermined switching speed at the time of setting the normal character size (250 ms), the result becomes as follows.

Namely, the time required for the transition from the screen shown in FIG. 6A to the screen shown in FIG. 6C becomes 250 ms×5=1250 ms. For this reason, the first to fifth menu items displayed on the screen shown in FIG. 6A will be displayed for only the predetermined period (1250 ms). The display time ends up becoming shorter in comparison with the time of setting the normal character size.

Accordingly, for users of mobile phones, particularly senior citizens and other users whose eyesight is failing, the problem arises that the viewability becomes worse and the usability ends up becoming worse.

Therefore, in the mobile phone 10 constituting a portable electronic device according to the embodiment of the present invention, the switching speed of the menu items is changed linked with the setting of the display character size.

Due to this, in the present embodiment, the viewability and operability are raised by making display times of selection items the same even when the amount of information displayed on the display part 16 is changed (reduced).

Specifically, in comparison with the time of setting the normal character size at the time of execution of the first display mode, at the time of setting the enlarged character size at the time of execution of the second display mode when decreased menu items (selection items) are displayed, the switching speed of the menu items at the time of the continuous selection operation is set slower.

Due to this, the time during which a menu item is selected at the time of a continuous selection operation, that is, the time of highlighting by cursor inverted display of a selected menu item, is set longer.

Due to this, the display time of the menu items displayed on the screen of the display part 16 can be set substantially the same as that at the time of setting the normal character size, and the viewability of the displayed menu items and the operability of the selection of the menu items can be improved.

At the time of setting the enlarged character size where the display character size is set "large", as shown in FIG. 6A to FIG. 6D, display of five rows of information on the screen of the display part 16 is enabled, and the switching speed of the menu items at the time of setting the enlarged character size is set to 350 ms.

Further, when selecting the sixth menu item "<6> Data folder" by a long depression operation (continuous selection operation), the state shown in FIG. 6D is exhibited. However, the time required for the transition from the screen shown in FIG. 6A (first screen) to the screen shown in FIG. 6C (second screen) becomes 350 ms×5=1750 ms.

For this reason, the first to fifth menu items displayed on the screen shown in FIG. 6A will be displayed for a predetermined time (1750 ms) the same as the display period at the time of setting the normal character size.

Note that, as shown in FIG. 6D, when displaying the sixth menu item "<6> Data folder" at the lowermost row of the screen of the display part 16 accompanied by highlighting by cursor inverted display, the second to sixth menu items will be displayed on the screen of the display part 16.

Accordingly, the first menu item "<1> Infrared communication" will be displayed for the predetermined time (1750 ms) in the same way.

Further, when the display character size is set at "largest", display of three rows of information on the screen of the display part 16 is enabled, and the switching speed of the menu item is set to 600 ms.

For this reason, the time up to the transition of the display screen of the menu items by the continuous selection operation becomes 600 ms×3=1800 ms. The display time of the menu items can be made substantially the same as the display time at the time of setting the normal character size.

In this way, when the display character size becomes larger, that is, when decreased menu items (selection items) are displayed, by setting the switching speed of the menu items slower, the viewability can be raised even at the time of setting the enlarged character size, so the usability (convenience) can be improved.

In particular, when a senior citizen etc. requires a relatively large character size in order to raise the viewability, by setting the switching speed further slower, the viewability is raised more and the convenience can be improved.

Here, the setting of the switching speed of the menu items slower corresponds to the setting of the time for which a menu item is selected, in other words, the highlighted time of a selected menu item, longer.

As explained above, the mobile phone 10 in the present embodiment has the display part 16 capable of displaying a plurality of selection items, the operation part 12 for selecting a selection item displayed on the display part 16, and the control part 18 switching the selection item selected from among the plurality of selection items displayed on the display part 16 along with the operation of the operation part 12. Further, the control part 18 has the function of changing the switching speed of the selection items selected along with the operation of the operation part 12 in accordance with the display form of the plurality of selection items displayed on the display part 16.

For example, the display control part 186 has the function of displaying a plurality of selection items (for example menu items) on the display part 16, highlighting a selection item selected in accordance with a selection operation of the operation part 12, and sequentially switching the selection items highlighted in accordance with a predetermined speed when the selection operation at the operation part 12 is continuously carried out by long depression etc.

At this time, the main control part 180 can execute the first display processing (normal display mode in which the normal character size is set) in which the selection items displayed on the display part 16 are displayed according to the predetermined display form and the second display processing (enlarged display mode in which the enlarged character size is set) in which a smaller number of selection items in comparison with those in the first display processing are displayed.

Further, for example the display control part 186 makes the display part 16 highlight a selection item and sets the predetermined speed in the second display processing slower in comparison with the predetermined speed in the first display processing.

For this reason, according to the present embodiment, for example, by changing the switching speed of the selection items at the time of the continuous selection operation, the usability can be improved.

Specifically, according to the portable electronic device of the present embodiment, for example, when displaying a small number of items on the screen, by setting the speed so that the operation of switching selections becomes slower in accordance with the continuous switching operation, shortening of the display time of the selection items on the screen is suppressed. At this time, the optimal switching speed is automatically set linked with the designated character size, therefore a portable electronic device provided with both good viewability and operability can be provided.

Figure 7:
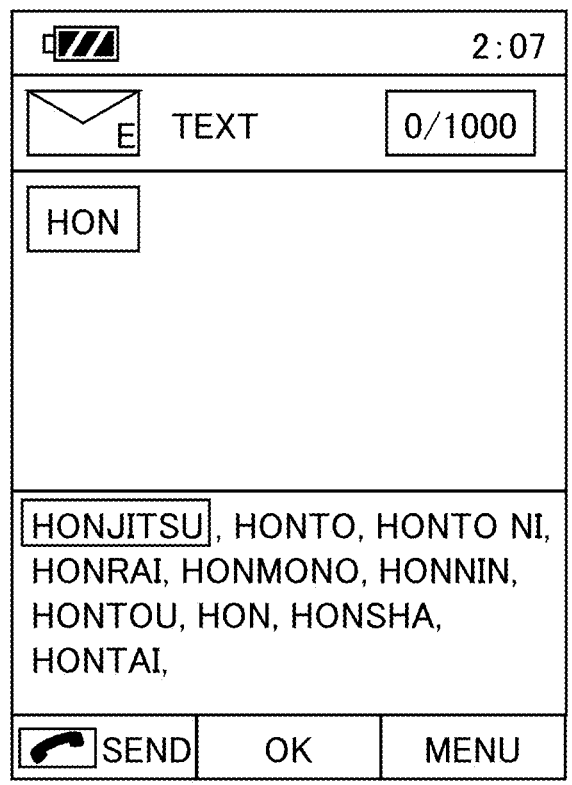
FIG. 7 is a diagram showing an example of the display form of conversion characters candidates for input characters of a portable electronic device according to an embodiment of the present invention.

Note that, according to the embodiment of the present invention described above, menu items were illustrated as the target of display of the selection items. However, the same application is possible even at the time of for example the selection of a conversion candidate as the selection item in the case of the display of conversion candidates for input characters at the time of the character input processing shown in FIG. 7.

Further, for the scrolling speed when scrolling character information for news and other superimposed text etc. as well, change of the scrolling speed is possible by linkage with the display character size in the same way.

Namely, at the time of setting the enlarged character size, the displayed menu items, conversion candidates, and other selection items are displayed enlarged.

For this reason, for example, sometimes the character information of a selection item will overflow from the screen and cannot be displayed at one time on the screen. In this case, when a selection item is selected, all character information of the selection item is displayed by horizontal scrolling.

Further, at the time of setting the enlarged character size, the switching speed at the time of a continuous selection operation is made slower for a selection item accompanied by horizontal scrolling. Namely, the time for which a selection item accompanied by horizontal scrolling is selected and highlighted is made longer, whereby the selection item will be selected longer in comparison with the time for which the selection item is selected at the time of the setting the normal character size.

Further, a selection item displayed by horizontal scrolling can display more character information by the horizontal scrolling by exactly the extended time, so about the same amount of character information as the character information of the selection item displayed at the time of setting the normal character size can be displayed.

Accordingly, when scrolling a selection item at the time of setting the enlarged character size, by making the switching speed at the time of the continuous selection operation slower, the same amount of character information as the time of setting the normal character size can be displayed, so the viewability can be raised and the convenience can be raised.

Note that, the switching speed may be set slower only for a selection item accompanied with horizontal scrolling as well.

Further, when performing horizontal scrolling, preferably the speed is set so that the scrolling speed (movement speed of the characters) at the time of setting the enlarged character size becomes faster in comparison with the scrolling speed at the time of setting the normal character size.

At the time of setting the enlarged character size, the amount of the character information scrolled over a certain period becomes smaller in comparison with the time of setting the normal character size.

For this reason, by making the scrolling speed at the time of setting the enlarged character size faster, the amount of the character information scrolled over a certain period can be made substantially the same as that at the time of setting the normal character size, and the viewability and convenience can be improved.

Note that, according to the embodiment described above, the switching speed at the time of setting the enlarged character size is set so that the required time for transition of the screen (page break) by the continuous selection operation becomes substantially the same between the time of setting the normal character size and the time of setting the enlarged character size.

However, the present invention is not limited to this configuration. It is sufficient so far as the switching speed is set so as to become slower in comparison with the time of setting the normal character size.

Further, according to the embodiment described above, the switching speed at the time of setting the enlarged character size is set in accordance with the set character size.

However, the present invention is not limited to this configuration. Another configuration of setting in accordance with for example the display mode or operation mode may be employed as well.

For example, compared to the normal operation mode, to improve usability for senior citizens etc., the switching speed of the selection items (menu items, conversion candidates, etc.) can be made slower in a limited operation mode enabling selection of limited (specified) menu items from among menu items which can be selected in the normal operation mode or in a priority operation mode in which menu items considered to have a high usage frequency can be selected with priority.

Further, according to the embodiment described above, at the time of setting the normal character size and the time of setting the enlarged character size, the menu items displayed as selectable items were the same. However, the present invention is not limited to this configuration. Specific selection items among the selection items which can be selected at the time of setting the normal character size may be displayed as selectable items at the time of setting the enlarged character size as well.

Further, according to the embodiment described above, the switching speed of the selection items at the time of a continuous selection operation became slower at the time of setting the enlarged character size where there were less selection items displayed (able to be selected) compared with at the time of setting the normal character size.

In the present invention, however, it is also possible to set the switching speed of the selection items slower only when it is not possible to display at one time all the selection items which can be selected on the screen of the display part 16 at the time of setting the enlarged character size, that is, a case where a screen transition (page break) occurs by a continuous selection operation.

This is because where a screen transition (page break) does not occur, all selection items can be displayed in the same way as at the time of setting the normal character size, so there is little possibility of the viewability becoming poorer.

Further, according to the embodiment described above, the switching speed of the selection items at the time of a continuous selection operation was made slower at the time of setting the enlarged character size where there were less selection items displayed (able to be selected) compared with at the time of setting the normal character size.

In the present invention, however, the device may be configured so that the screen transition can be instructed so that a next screen (next page) or previous screen (previous page) can be displayed by the operation by the operation part 12 at the time of setting this enlarged character size as well.

In this case, at the time of setting the enlarged character size, there are a fewer selection items displayed and the switching speed becomes slower, therefore a longer time will be required for selecting a selection item displayed on the next screen (selection item displayed by screen transition).

In this case, by enabling selection by instructing screen transition (next page or previous page) by the operation of the operation part 12 to display the other selection items, the user can quickly display and select any selection item, so the operability can be improved. Note that, the device may be configured so that the screen transition can be instructed also at the time of setting the normal character size as well.

Further, according to the embodiment described above, as selection items, the explanation was given by mentioning as an example the menu items on the menu screen and the character conversion candidates at the time of the input of characters on a character input screen.

However, the present invention is not limited to these and can be applied to other selection items (for example, dates of a calendar or schedule items, music in a music play back function, registered parties in an address book function, a list of mail and other various types of data, and so on) as well.

Further, according to the embodiment described above, the device was configured so that the switching speed of the selection items was changed in accordance with the display character size, display size of the selection items, or the number of the selection items displayed. However, the device may be configured so that the switching speed of the selection items is changed in accordance with the amount of information displayed in the selection items as well.

Specifically, when displaying and enabling selection of menu items of a function menu as the selection items, as the display form of these menu items, it is made possible to selectively display the menu by either of a name display mode of displaying only the names of the menu items or a function display mode of displaying both of the names of the menu items and explanations of the functions of the menu items. Further, when the menu items are displayed by the function display mode, the selection items are switched by a switching speed slower than the switching speed of the selection items in the name display mode.

In this way, when the function display mode of displaying not only the names of the menu items displayed in the name display mode, but also explanations of the functions of the menu items as information of the selection items is set, the amount of the information displayed by the selection items becomes larger than the amount of information displayed in the name display mode, so a longer time will be required for recognizing the information being displayed as a selected selection item. However, the selection items are switched at a switching speed slower than the switching speed of the selection items in the name display mode, therefore it becomes easier to recognize the information displayed by a selected selection item.

Further, when the amount of the information displayed by the selection items is large and this information is scrolled in order to display all of that information, by switching the selection items at a switching speed slower than the switching speed for the selection items for which the display information is not scrolled, it becomes easier to recognize the information of the selection items for which the information is scrolled.

Further, according to the embodiment described above, the device was configured so that the switching speed of the selection items was made slower at the time of setting the enlarged character size or when a limited operation mode or specific operation mode or the like was selected and less selection items were displayed. However, contrary to this, the switching speed of the selection items may be made faster (the time for which a selection item is selected (highlighted) is made shorter) when more selection items are displayed as well.

Further, according to the embodiment of the present invention described above, as the technique of highlighting a selected selection item, the explanation was given by mentioning as an example cursor inverted display, but highlighting using another technique may be carried out as well.

Note that, according to the portable electronic device of the embodiment of the present invention described above, only a mobile phone was illustrated as the portable electronic device, but similar application is possible also for devices having similar configurations, for example, PDA's (Personal Digital Assistants), game machines, etc.

Further, the functions of constituent blocks provided in the portable electronic device according to the embodiment of the present invention shown in FIG. 1 may be all realized by hardware or at least a portion thereof may be realized by software.

For example, the data processing in the main control part 180, communication control part 181, data input control part 182, audio input/output control part 184, and display control part 186 which configure the control part 18 may be realized by an LSI or other hardware.

Further, at least a portion thereof may be realized in a computer by one or more programs.

The invention claimed is:

1. A portable electronic device, comprising
a display part capable of displaying a list containing a plurality of selectable items,
an operation part for selecting a selectable item, and
a control part configured to switch from a selected item to another one of the plurality of selectable items by operation of the operation part, wherein the control part changes a character size of the plurality of selectable items, wherein the control part changes a switching speed of switching from the selected item to another one of the plurality of selectable items shown on the list, and wherein the control part slows down the switching speed when the character size of the plurality of selectable items is increased, larger than before and the list contains the same number of selectable items.

2. A portable electronic device as set forth in claim 1, wherein the control part changes the switching speed when an operation for selecting the selectable item is continuously carried out.

3. A portable electronic device as set forth in claim 2, wherein when a screen is switched from a first screen on which a portion of the plurality of selectable items is displayed in accordance with the continuous operation for selecting a selectable item to a second screen on which the remaining portion of the plurality of selectable items is displayed, the control part changes the switching time from the first screen to the second screen in accordance with the switching speed of the selected items displayed on the first screen.

4. A portable electronic device as set forth in claim 1, wherein the plurality of selectable items displayed on the display part include menu items of a function menu.

5. A portable electronic device as set forth in claim 1, wherein the plurality of selectable items displayed on the display part include candidates for change of an input character at the time of character input processing.

6. A portable electronic device as set forth in claim 1, wherein the control part displays the selectable item selected along with operation of the operation part by a display form different from the other selectable items being displayed on the display part.

7. A portable electronic device as set forth in claim 1, wherein the control part sets the switching speed with reference to a switching speed judgment table.

8. A portable electronic device as set forth in claim 7, wherein the switching speed judgment table maps character size to switching speed.

9. A portable electronic device as set forth in claim 8, wherein the switching speed judgment table maps smaller character sizes to faster switching speeds.

10. A portable electronic device as set forth in claim 7, wherein the switching speed judgment table is stored in memory.

* * * * *